US011231852B2

(12) United States Patent
Badam et al.

(10) Patent No.: US 11,231,852 B2
(45) Date of Patent: Jan. 25, 2022

(54) EFFICIENT SHARING OF NON-VOLATILE MEMORY (71) Applicant: MICROSOFT TECHNOLOGY LICENSING, LLC, Redmond, WA (US)

(72) Inventors: Anirudh Badam, Issaquah, WA (US); Sriram Govindan, Redmond, WA (US); Bikash Sharma, Bothell, WA (US); Badriddine Khessib, Redmond, WA (US); Iyswarya Narayanan, State College, PA (US); Aishwarya Ganesan, Madison, WI (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 685 days.

(21) Appl. No.: 15/845,723

(22) Filed: Dec. 18, 2017

(65) Prior Publication Data
US 2019/0187897 A1 Jun. 20, 2019

(51) Int. Cl.
*G06F 3/06* (2006.01)
*G06F 12/0802* (2016.01)
*G06F 9/50* (2006.01)

(52) U.S. Cl.
CPC .......... *G06F 3/0604* (2013.01); *G06F 3/0631* (2013.01); *G06F 3/0685* (2013.01);
(Continued)

(58) Field of Classification Search
CPC .... G06F 3/0631; G06F 3/0604; G06F 3/0685; G06F 3/0634; G06F 3/0632; G06F 9/5016; G06F 2003/0691
See application file for complete search history.

(56) References Cited

U.S. PATENT DOCUMENTS 9,606,870 B1 * 3/2017 Meiri .................. G06F 11/2069
2012/0047313 A1 2/2012 Sinha et al.
(Continued)

OTHER PUBLICATIONS

Lei, et al., "Memos: Revisiting Hybrid Memory Management in Modern Operating System", Retrieved From <<https://arxiv.org/ftp/arxiv/papers/1703/1703.07725.pdf>>, Mar. 22, 2017, pp. 1-14.
(Continued)

*Primary Examiner* — David Yi
*Assistant Examiner* — Nicholas A. Paperno
(74) *Attorney, Agent, or Firm* — Workman Nydegger (57) ABSTRACT

In the embodiment a determination is made, for one or more applications being executed by the computing system, of an amount of the first or second memory being used by the one or more applications. Based on the determination, a portion of the memory resources of the third memory are configured to function with the first or second memory when it is determined that the amount of the first or second memory being used by the one or more applications is not sufficient for the memory needs of the one or more applications and a portion of the memory resources of the third memory are removed from functioning with the first or second memory when it is determined that the amount of the first or second memory being used by the one or more applications is more than is needed for the memory needs of the one or more applications.

18 Claims, 6 Drawing Sheets (52) U.S. Cl.
CPC ........ G06F 9/5016 (2013.01); G06F 12/0802 (2013.01); *G06F 2209/508* (2013.01); *G06F 2212/60* (2013.01)

(56) References Cited

U.S. PATENT DOCUMENTS

2017/0315924 A1* 11/2017 Blount .................... G06F 12/10
2018/0024867 A1* 1/2018 Gilsdorf ................. H04L 49/35
 709/226
2018/0081590 A1* 3/2018 Farahani ............. G06F 13/1673

OTHER PUBLICATIONS

Luiz, et al., "Page placement in hybrid memory systems", In Proceedings of International Conference on Supercomputing, May 31, 2011, pp. 85-95.
"International Search Report & Written Opinion Issued in PCT Application No. PCT/US2018/062687", dated Mar. 7, 2019, 16 Pages. (MS# 403330-WO-PCT).

* cited by examiner

EFFICIENT SHARING OF NON-VOLATILE MEMORY

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been, and are being, developed in all shapes and sizes with varying capabilities. As such, many individuals and families alike have begun using multiple computer systems throughout a given day.

Computing systems typically have different types of memory, which may include volatile main memory and persistent storage memory. In addition, there may be configurable non-volatile memory that may be configured to function with the volatile main memory and the persistent storage memory. However, there is currently no way to dynamically share the configurable non-volatile memory across the volatile main memory and the persistent storage memory The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An embodiment disclosed herein is related to computing systems and methods for dynamically sharing non-volatile memory across other memory types. In the embodiment, the computing system include a first memory, a second memory that is of a type that is different from a type of the first memory, and a third memory having memory resources that are configurable to function with the first memory type or to function with the second memory type. In the embodiment a determination is made, for one or more applications being executed by the computing system, of an amount of the first or second memory being used by the one or more applications. Based on the determination, a portion of the memory resources of the third memory are configured to function with the first or second memory when it is determined that the amount of the first or second memory being used by the one or more applications is not sufficient for the memory needs of the one or more applications and a portion of the memory resources of the third memory are removed from functioning with the first or second memory when it is determined that the amount of the first or second memory being used by the one or more applications is more than is needed for the memory needs of the one or more applications.

Another embodiment disclosed herein is related to computing systems and methods for dynamically sharing non-volatile memory across other memory types. In the embodiment, the computing system include a first memory, a second memory that is of a type that is different from a type of the first memory, and a third memory having memory resources that are configurable to function with the first memory type or to function with the second memory type, where a first portion of the memory resources are configured to function with the first memory type and a second portion of the memory resources are configured to function with the second memory type. In the embodiment a determination is made, for one or more applications being executed by the computing system, of an amount of the first or second memory being used by the one or more applications. Based on the determination, at least some of the memory resources included in the first portion of the memory resources that are configured to function with the first memory type are caused to be reconfigured to function with the second memory type and to be added to the second portion of the memory resources when it is determined that the amount of the second memory being used by the one or more applications is not sufficient for the memory needs of the one or more application and at least some of the memory resources included in the second portion of the memory resources that are configured to function with the second memory type are caused to be removed from the second portion when it is determined that the amount of the second memory being used by the one or more applications is more than is needed for the memory needs of the one or more applications.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Non-volatile memory can be used either as volatile main memory or as a non-volatile cache for accelerating accesses to solid state storage memory. Existing solutions statically partition non-volatile memory across these tasks. However, existing solutions are unable to dynamically share the non-volatile memory across the volatile main memory or as a non-volatile cache.

An embodiment disclosed herein is related to computing systems and methods for dynamically sharing non-volatile memory across other memory types. In the embodiment, the computing system include a first memory, a second memory that is of a type that is different from a type of the first memory, and a third memory having memory resources that are configurable to function with the first memory type or to function with the second memory type. In the embodiment a determination is made, for one or more applications being executed by the computing system, of an amount of the first or second memory being used by the one or more applications. Based on the determination, a portion of the memory resources of the third memory are configured to function with the first or second memory when it is determined that the amount of the first or second memory being used by the one or more applications is not sufficient for the memory needs of the one or more applications and a portion of the memory resources of the third memory are removed from functioning with the first or second memory when it is determined that the amount of the first or second memory being used by the one or more applications is more than is needed for the memory needs of the one or more applications.

Another embodiment disclosed herein is related to computing systems and methods for dynamically sharing non-volatile memory across other memory types. In the embodiment, the computing system include a first memory, a second memory that is of a type that is different from a type of the first memory, and a third memory having memory resources that are configurable to function with the first memory type or to function with the second memory type, where a first portion of the memory resources are configured to function with the first memory type and a second portion of the memory resources are configured to function with the second memory type. In the embodiment a determination is made, for one or more applications being executed by the computing system, of an amount of the first or second memory being used by the one or more applications. Based on the determination, at least some of the memory resources included in the first portion of the memory resources that are configured to function with the first memory type are caused to be reconfigured to function with the second memory type and to be added to the second portion of the memory resources when it is determined that the amount of the second memory being used by the one or more applications is not sufficient for the memory needs of the one or more application and at least some of the memory resources included in the second portion of the memory resources that are configured to function with the second memory type are caused to be removed from the second portion when it is determined that the amount of the second memory being used by the one or more applications is more than is needed for the memory needs of the one or more applications.

The embodiments disclosed herein provide various technical effects and benefits over the current technology. For example, one direct improvement is the embodiments disclosed herein provide for the dynamic sharing of non-volatile memory resources across other memory types. To clarify, conventional systems use statistical analysis to determine if the non-volatile memory resources should be used as volatile main memory or as the write cache for use with the solid state storage memory. As will be explained further, such statistical analysis fails to take into account dynamic changes between read and write commands performed by applications being executed by the computing system. The embodiments disclosed herein are able to take the dynamic changes between read and write commands into account when dynamically sharing the non-volatile memory resources across the other memory types. Further, the technical effects related to the disclosed embodiments can also include improved user convenience and efficiency gains.

Some introductory discussion of a computing system will be described with respect to FIG. 1. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
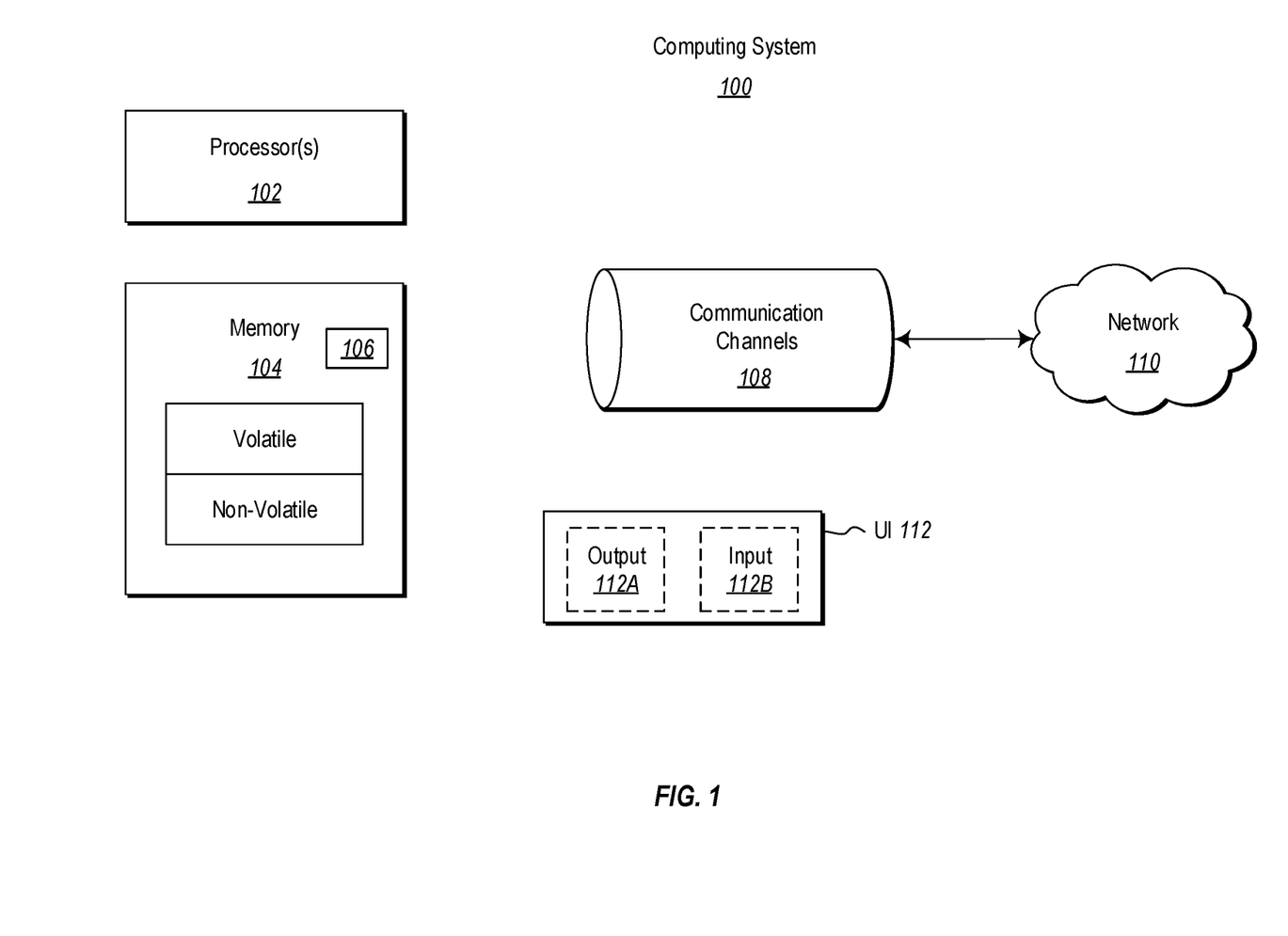
FIG. 1 illustrates an example computing system in which the principles described herein may be employed.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2A:
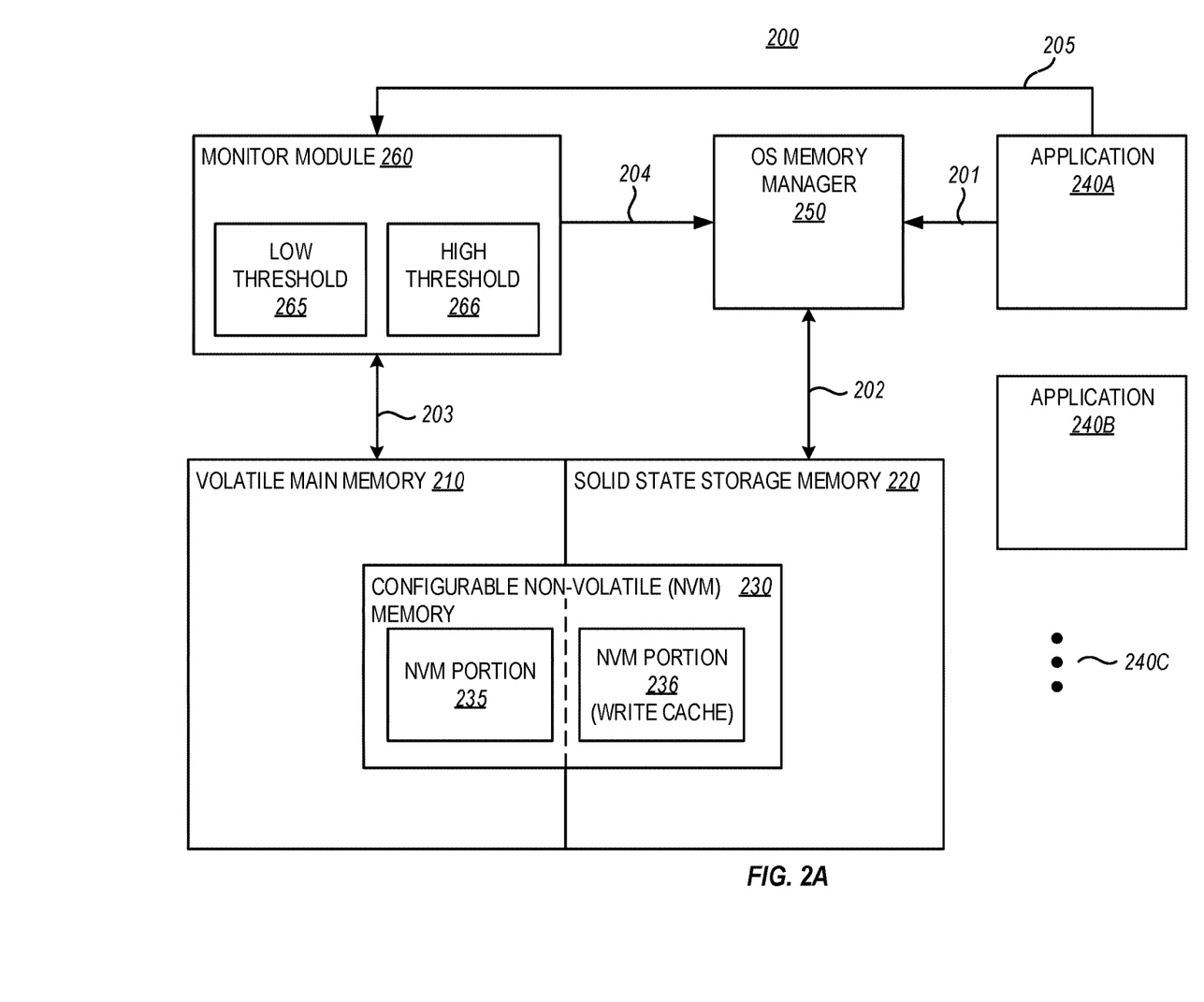
FIG. 2A illustrates a computing system that may implement the embodiments disclosed herein.

Attention is now given to FIG. 2A, which illustrates an embodiment of a computing system 200, which may correspond to the computing system 100 previously described. The computing system 200 includes various components or functional blocks that may implement the various embodiments disclosed herein as will be explained. The various components or functional blocks of computing system 200 may be implemented on a local computing system or may be implemented on a distributed computing system that includes elements resident in the cloud or that implement aspects of cloud computing. The various components or functional blocks of the computing system 200 may be implemented as software, hardware, or a combination of software and hardware. The computing system 200 may include more or less than the components illustrated in FIG. 2A and some of the components may be combined as circumstances warrant. Although not necessarily illustrated, the various components of the computing system 200 may access and/or utilize a processor and memory, such as processor 102 and memory 104, as needed to perform their various functions.

As shown in FIG. 2A, the computing system 200 may include a volatile main memory 210. In some embodiments, the volatile main memory 210 may be Dynamic Random Access Memory (DRAM) or the like that is accessed by a virtual memory manager of an operating system of the computing system and that is byte addressable. As may be appreciated, the volatile main memory 210 may be faster than other types of memory and so may be well suited to handle applications having a need for a large number of read operations since faster reads are desirable.

The computing system 200 may also include a solid state storage memory 220. In some embodiments, the solid state storage memory 220 may be SSD memory or the like that is accessed by file system of the operating system and that is block addressable. The solid state storage memory may typically be much slower than the volatile main memory 210 and may cost much less. Accordingly, the solid state storage memory may be well suited to handle applications having a need for a large number of writes. In this specification and in the claims, the volatile main memory 210 and the solid state storage memory 220 may be referred to as either a first or a second memory.

The computing system 200 may also include a configurable non-volatile memory 230. Examples of the configurable non-volatile memory 230 include, but are not limited to, 3D XPoint, non-volatile dual in-line memory module (NVDIMM)-N, and NVFIMM-SW. In operation, the configurable non-volatile memory 230 may be configured to function with or be used by the volatile main memory 210 and/or the solid state storage memory 220. That is, the memory resources of the configurable non-volatile memory 230 may be configured to function in a manner similar to the volatile main memory 210 or to function in a manner similar to the solid state storage memory 220. For example, in one embodiment, the memory resources of the configurable non-volatile memory 230 may be configured to be used as random access memory in conjunction with the volatile main memory 210. In other embodiments, the memory resources of the configurable non-volatile memory 230 may be configured to be used as a write cache that works with the solid state storage memory 220 for write operations. It will be appreciated that the configurable non-volatile memory 230 may have a cost and speed that is between the volatile main memory 210 and the solid state storage memory 220.

In FIG. 2A, the configurable non-volatile memory 230 is shown as being included partially in both the volatile main memory 210 and the solid state storage memory 220. This is for ease of illustration only so as to emphasize that the configurable non-volatile memory 230 is configurable to function with the volatile main memory 210 and/or the solid state storage memory 220. Accordingly, the configurable non-volatile memory 230 may be included as a memory that is separate from the other two memories.

FIG. 2A also shows a non-volatile portion (NVM) 235 and a NVM portion 236. The NVM portions 235 and 236 represent memory resources of the configurable non-volatile memory 230. In the illustrated embodiment, the NVM portion 235 is on the volatile main memory 210 side to represent that the memory resources of the NVM portion 235 are configured to be used with or function as the volatile main memory 210. The NVM portion 236 is on the solid state storage memory side to represent that the memory resources of the NVM portion 236 are configured to be used with or function as the solid state memory 220. As mention above, in one embodiment the NVM portion 236 may be configured as a write cache for the solid state storage memory 220.

The computing system 200 may also include one or more applications (also hereinafter referred to as applications 240) 240A, 240B and potentially any number of additional applications 240C that may be executed by the computing system 200. The applications 240 may be any reasonable application that uses the memory resources of the computing system 200. Accordingly, the embodiments disclosed herein are not limited by any particular type of the applications 240.

The computing system 200 may also include an Operating System (OS) memory manager 250. It will be appreciated that the OS memory manager 250 is meant to represent all of the various memory management systems of the operating system. For example, the OS memory manager 250 may include or represent a virtual memory manager, a file system manager, a memory allocator, or any other element of operating system memory management. Accordingly, the embodiments disclosed herein are not limited by any particular type of OS memory manager 250 or to any particular type of operating system. In operation, one or more of the applications 240 may make a call to the OS memory manager 250 to receive an allocation of memory resources of the volatile main memory 210 and/or the solid state storage memory 220 as represented by the line 201. The OS memory manager 250 may then provide an allocation of the volatile main memory 210 and/or the solid state storage memory 220 as represented by the line 202. If the application 240 needs to perform a read operation, then the OS memory manager 250 may allocate volatile main memory 210 resources and if the application 240 needs to perform a write operation, then the OS memory manager 250 may allocate solid state storage memory 220 resources.

As discussed above, the configurable non-volatile memory 230 may be configured to function with the volatile main memory 210, the solid state memory 220, or to function with or be used by both. As may be appreciated, the configurable nature of the configurable non-volatile memory 230 provides many advantages. For example, since it is generally less expensive than the volatile main memory 210 while still having a latency or speed that is faster than many other types of memory, it provides for the opportunity to increase the amount of memory resources that function as volatile main memory without the need to include more expensive volatile main memory. This may be useful when the applications 240 perform a large number of read operations that require fast speeds and low latency.

Likewise, since the configurable non-volatile memory 230 is generally much faster than the solid state storage memory 220, this provides for the opportunity to increase the latency or speed of the solid state storage memory when the configurable non-volatile memory 230 functions with the solid state storage memory. This may be especially true when the configurable non-volatile memory 230 functions as write cache for the solid state storage memory 220. This may be useful when the applications 240 preform a large number of write applications since the speed of the write operations may be increased.

As may be appreciated, most applications 240 may perform both read and write applications. Further, the volume of the read and write applications is generally not consistent. Thus, there may be times when one or more of the applications 240 are read heavy where it would be useful configure more of the resources of the configurable non-volatile memory 230 to function with the volatile main memory 210 and there may be other time when one or more of the applications 240 may be write heavy where it would be useful to configure more of the resources of the configurable non-volatile memory 230 to function with the solid state storage memory.

Unfortunately, prior computing system have had no easy way to configure the memory resources of the configurable non-volatile memory 230 in a dynamic manner. For example, at best some systems have attempted, by use of a statistical analysis of the memory usage by the applications 240, to determine when to configure all the memory resources of the configurable non-volatile memory 230 as either volatile main memory 210 or solid state storage memory 220. That is, if the statistical analysis determined a read heavy application 240, all of the resources of the configurable non-volatile memory 230 would be configured to function with the volatile main memory 210. Conversely, if the statistical analysis determined a write heavy application 240, then all of the memory resources of the configurable non-volatile memory 230 would be configured to function with the solid state storage memory 220. However, such use of the statistical analysis does not take into account the dynamic changes between read and write operations performed by the applications 240 and does not allow for portions of the memory resources of the configurable non-volatile memory 230 to be dynamically configured as one of the volatile main memory 210 or solid state storage memory 220 an then dynamically reconfigured as the other of the volatile main memory 210 or solid state storage memory 220 when read and write operations dynamically change. Advantageously, the embodiments disclosed herein provide for the dynamic sharing of the resources of the configurable non-volatile memory 230 across the volatile main memory 210 and the solid state storage memory 220 as the read or write loads on these memories dynamically changes.

As shown in FIG. 2A, the computing system 200 may include a monitor module 260. Although the monitor module 260 is shown as being a separate module, this is for ease of explanation only and need not be the case. In some embodiments, the monitor module may be block device of the write cache 236 or some other portion of the NVM portion 236. In other embodiments, the monitor module 260 may be part of the NVM portion 235. Accordingly, the embodiments disclosed herein are not limited to any specific implementation of the monitor module 260.

In operation, the monitor module 260 is able to determine, for one or more of the applications 240, the amount of the volatile main memory 210 and/or the solid state storage memory 220 being by the one or more applications 240. This monitoring and determination are represented by the line 203. In other words, the monitor module 260 is able to determine a read or write load on the volatile main memory 210 and/or the solid state storage memory 220 by the one or more applications 240. Based on this determination, the monitor module 260 is able to cause that the resources of the configurable non-volatile memory 230 are dynamically shared between the volatile main memory 210 and the solid state storage memory 220 based on the dynamically changing load. For example, the monitor module 260 may make a request as represent by line 204 to the OS memory manager 250 to move or reallocate some of the memory resources of the configurable non-volatile memory 230 that were being used by the volatile main memory 210 or the solid state storage memory 220 to the other of the volatile main memory 210 or the solid state storage memory 220. Advantageously, since the monitor module 260 makes use of the existing operating system memory management (i.e., OS memory manager 250) to dynamically share the resources of the configurable non-volatile memory 230, no changes need be made to the underlying operating system. The operation of the monitor module 260 will be explained in more detail to follow.

In some embodiments, the determination of the amount of the volatile main memory 210 and the solid state storage memory 220 being used by the one or more applications 240 is based at least in part on a low or first threshold 265 and a high or second threshold 266. In some embodiments, the low and high thresholds 265 and 266 may be based on a historical load of the monitored memory such that when the load on the memory falls below the low threshold 265, thus indicating low usage of the memory by the one or more applications 240, then the monitor module 260 may determine that one of the volatile main memory 210 or the solid state storage memory 220 no longer needs use of all it currently allocated configurable non-volatile memory 230 resources. The monitor module 260 may request that the OS memory manager 250 reallocate these resources as needed to other elements of the computing system 200. Likewise, when the load goes above the high threshold 266, thus indicating high usage of the memory by the one or more applications 240, then the monitor module 260 may determine that the one of the volatile main memory 210 or the solid state storage memory 220 needs the use of more than its currently allocated configurable non-volatile memory 230 resources. The monitor module 260 may request that the OS memory manager 250 allocate additional configurable non-volatile memory 230 resources as needed from the other elements of the computing system 200.

In some embodiments, a buffer region may be formed between the low and high thresholds 265 and 266. As may be appreciated, there may be many small changes in the load on the volatile main memory 210 or the solid state storage memory 220 caused by one or more of the applications 240. Accordingly, if the values of the low and high thresholds 265 and 266 were placed too close together, then the monitor module may constantly determine that some of the resources of the configurable non-volatile memory 230 need to moved. This would lead to an inefficient operation of the computing system 200. Accordingly, forming the buffer region between the thresholds accounts for the small changes in the load without causing the monitor module to make any determinations that would lead to the moving of the resources of the configurable non-volatile memory 230.

In some embodiments, the one or more applications 240 may be configured to inform the monitor module 260 of whether they are read heavy or write heavy. For example, the one or more applications may provide a value from 0 to 1, where values below 0.5 indicate read heavy and values above 0.5 indicate write heavy. Of course, the one or more applications 240 may inform the monitor module 260 of whether they are read heavy or write heavy in other reasonable ways. The monitor module may then set the values of the low and high thresholds 265 and 266 based on whether the one or more applications are read or write heavy.

Figure 2B:
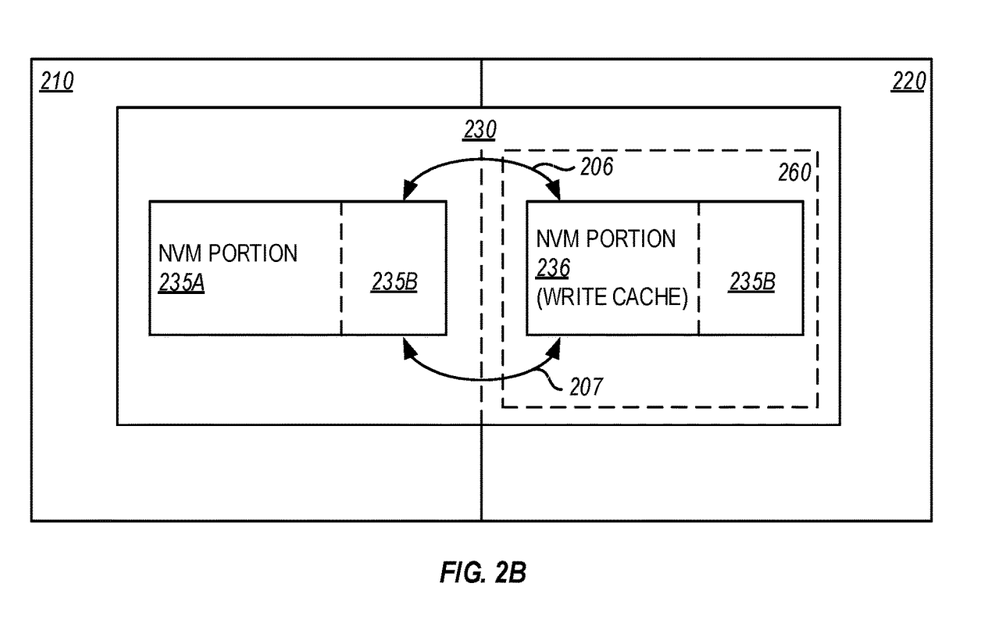
FIG. 2B illustrates an embodiment of the computing system of FIG. 2A.

Specific embodiments of the operation of the monitor module 260 will now be explained in more detail. FIG. 2B illustrates an embodiment of the computing system 200. Accordingly, only some of the elements shown in FIG. 2A are included in FIG. 2B. As shown, in this embodiment, the monitor module 260 may be implemented as a block device associated with the NVM portion (write cache) 236 as illustrated by the dashed lines. Thus, in the embodiment, the load on the solid state storage memory 220 and the NVM portion (write cache) 236 may be monitored to determine if dynamic sharing of the resources of the configurable non-volatile memory 230 is needed. As further illustrated, the NVM portion 235 includes a portion 235A and a portion 235B, which represent different portions of the memory resources of the configurable non-volatile memory 230 allocated to the volatile main memory 210.

In operation, the monitor module 260 may determine that the load on the solid state storage memory 220 and its allocated portion of the configurable non-volatile memory 230, NVM portion 236, has exceeded the high threshold 266 in the manner previously described because the one or more applications 240 are performing a large number of write operations, that is they are write heavy. Accordingly, the monitor module 260 may request that the OS memory manager 250 allocate additional configurable non-volatile memory 230 resources for the use of the solid state storage memory 220. As shown by line 204, the OS memory manager 250 may allocate the NVM portion 235B for the use of the solid state storage memory 220 as shown in the figure. The NVM portion 235B may be reconfigured to function as part of the write cache in accordance with the solid state storage memory 220.

The monitor module may then determine that the load on the solid state storage memory 220 and its allocated portion of the configurable non-volatile memory 230, NVM portion 236, has dropped below the low threshold 265 in the manner previously described because the one or more applications 240 are no longer write heavy. Accordingly, the monitor module 260 may request that the OS memory manager 250 allocate some configurable non-volatile memory 230 resources from the use of the solid state storage memory 220 to the use of other elements of the computing system 200. In the illustrated embodiment, the resources are allocated for the use of the volatile main memory 210. As shown by line 205, the OS memory manager 250 may allocate the NVM portion 235B for the use of the volatile main memory 210 as shown in the figure. The NVM portion 235B may be reconfigured to function with the volatile main memory 210. It will noted that although the embodiment of FIG. 2B shows the same NVM portion 235B being dynamically shared by the volatile main memory 210 and the solid state storage memory 220, this is for ease of illustration only. It will be appreciated that other portions of the NVM portion 235 or the NVM portion 236 may be dynamically shared as circumstances warrant.

Figure 2C:
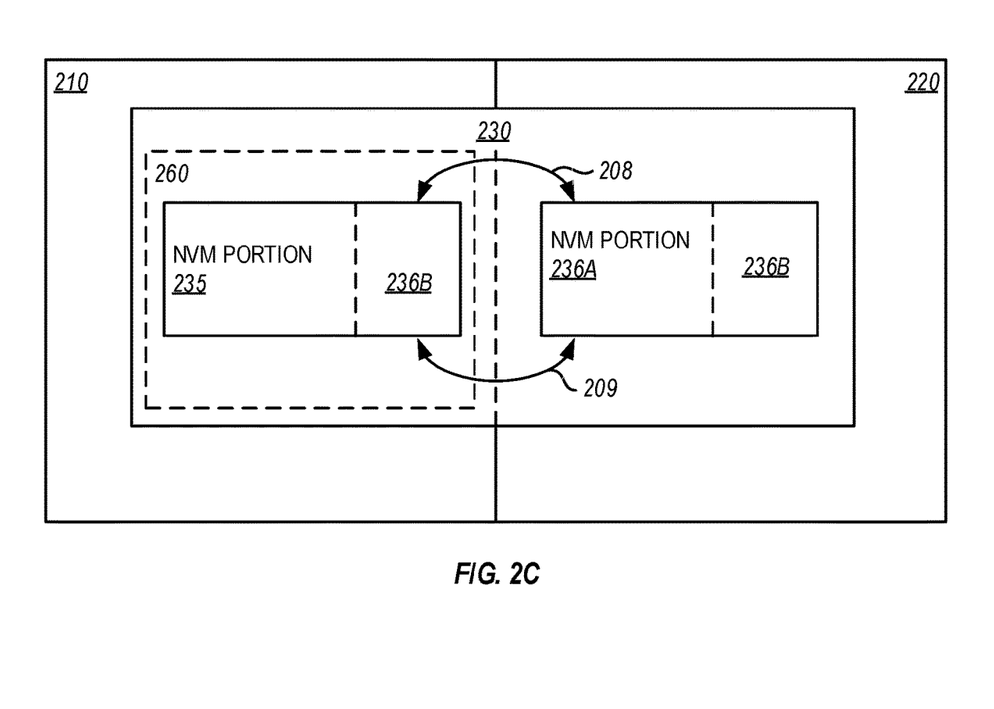
FIG. 2C illustrates an embodiment of the computing system of FIG. 2A.

FIG. 2C illustrates an alternative embodiment of the computing system 200. Accordingly, only some of the elements shown in FIG. 2A are included in FIG. 2C. As shown, in this embodiment, the monitor module 260 may be implemented as a block device associated with the NVM portion 235 as illustrated by the dashed lines. Thus, in the embodiment, the load on the volatile main memory 210 and the NVM portion 235 may be monitored to determine if dynamic sharing of the resources of the configurable non-volatile memory 230 is needed. As further illustrated, the NVM portion 236 includes a portion 236A and a portion 236B, which represent different portions of the memory resources of the configurable non-volatile memory 230 allocated to the solid state storage memory 220.

In operation, the monitor module 260 may determine that the load on the volatile main memory 210 and its allocated portion of the configurable non-volatile memory 230, NVM portion 235, has exceeded the high threshold 266 in the manner previously described because the one or more applications 240 are performing a large number of read operations, that is they are read heavy. Accordingly, the monitor module 260 may request that the OS memory manager 250 allocate additional configurable non-volatile memory 230 resources for the use of the volatile main memory 210. As shown by line 206, the OS memory manager 250 may allocate the NVM portion 236B for the use of the volatile main memory 210 as shown in the figure. The NVM portion 236B may be reconfigured to function with the volatile main memory 210.

The monitor module may then determine that the load on volatile main memory 210 and NVM portion 235, has dropped below the low threshold 265 in the manner previously described because the one or more applications 240 are no longer read heavy. Accordingly, the monitor module 260 may request that the OS memory manager 250 allocate some configurable non-volatile memory 230 resources from the use of the volatile main memory 210 to the use of other elements of the computing system 200. In the illustrated embodiment, the resources are allocated for the use of the solid state storage memory 220. As shown by line 207, the OS memory manager 250 may allocate the NVM portion 236B for the use of the solid state storage memory 220 as shown in the figure. The NVM portion 236B may be reconfigured to function with the solid state storage memory 220. It will noted that although the embodiment of FIG. 2C shows the same NVM portion 236B being dynamically shared by the volatile main memory 210 and the solid state storage memory 220, this is for ease of illustration only. It will be appreciated that other portions of the NVM portion 235 or the NVM portion 236 may be dynamically shared as circumstances warrant.

Figure 3:
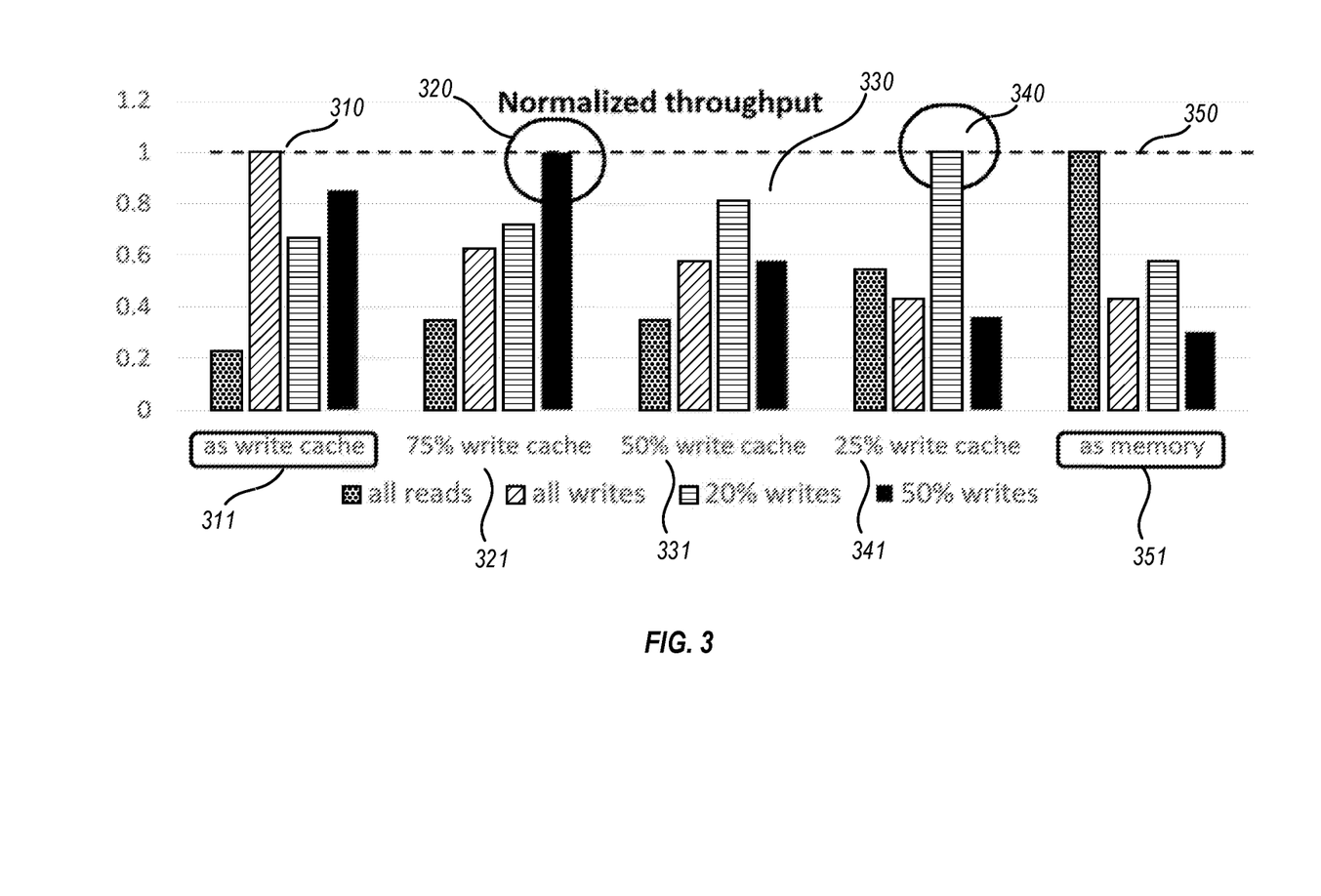
FIG. 3 illustrates the performance of the embodiments disclosed herein in dynamically sharing the resources of the configurable non-volatile memory.

FIG. 3 graphically illustrates the performance of the embodiments disclosed herein in dynamically sharing the resources of the configurable non-volatile memory 230 based on the memory load. As shown, FIG. 3 illustrates the normalized random read and write operations performed by one or more of the applications 240. As the amount of writes decreases, the amount of the resources of the configurable non-volatile memory 230 configured as the write cache also decreases.

As shown at 310, the all write operations is the largest value. Accordingly, as shown at 311 the resources of the configurable non-volatile memory 230 may all be allocated to the NVM portion 236 to function as the write cache with the solid state storage memory 220.

As shown at 320, the 50% write operations is the largest value. Accordingly, as shown at 321 75% of the resources of the configurable non-volatile memory 230 may all be allocated to the NVM portion 236 to function as the write cache in accordance with the solid state storage memory 220 and 25% may be allocated to the NVM portion 235 to function with the volatile main memory 210.

As shown at 330, the 20% write operations is the largest value, although it is not much larger than the other values. Accordingly, as shown at 331 50% of the resources of the configurable non-volatile memory 230 may all be allocated to the NVM portion 236 to function as the write cache in accordance with the solid state storage memory 220 and 50% may be allocated to the NVM portion 235 to function with the volatile main memory 210.

As shown at 340, the 20% write operations is the largest value. Accordingly, as shown at 341 25% of the resources of the configurable non-volatile memory 230 may all be allocated to the NVM portion 236 to function as the write cache in accordance with the solid state storage memory 220 and 75% may be allocated to the NVM portion 235 to function with the volatile main memory 210.

As shown at 350, the all read operations is the largest value. Accordingly, as shown at 351 the resources of the configurable non-volatile memory 230 may all be allocated to the NVM portion 235 to function as memory with the volatile main memory 210.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
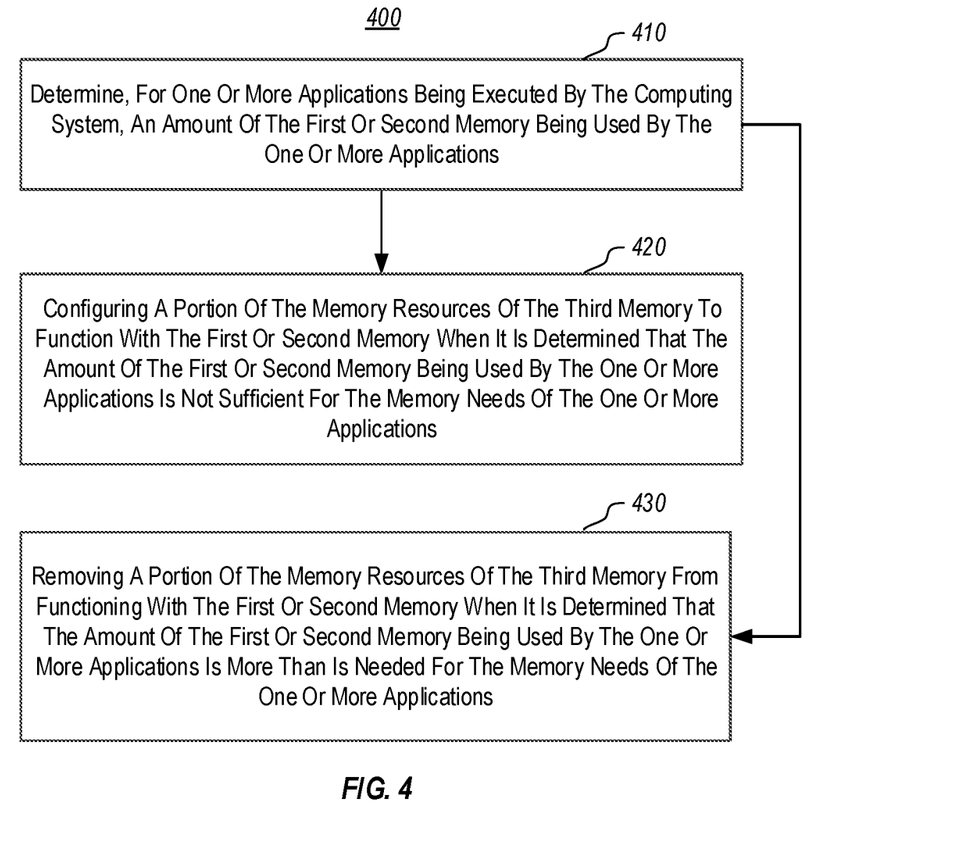
FIG. 4 illustrates a flow chart of an example method for dynamically sharing non-volatile memory across other memory types.

FIG. 4 illustrates a flow chart of an example method 400 for dynamically sharing non-volatile memory across other memory types. The method 400 will be described with respect to one or more of the FIGS. 2A-2C discussed previously.

The method 400 includes determining, for one or more applications being executed by the computing system, an amount of the first or second memory being used by the one or more applications. (410). For example, as previously described the monitor module 260 may determine how much of the volatile main memory 210 and/or the solid state storage memory 220 are being used by one or more of the applications 240.

Based on the determination at 410, the method 400 includes configuring a portion of the memory resources of the third memory to function with the first or second memory when it is determined that the amount of the first or second memory being used by the one or more applications is not sufficient for the memory needs of the one or more applications (420). For example, as previously described when the monitor module determines that that load of one or more applications 240 on either the volatile main memory 210 or the solid state storage memory 220 has exceeded the high threshold 266, the monitor module may request that the OS memory manager 250 allocate additional memory resources of the configurable non-volatile memory 230 as needed. The memory resources of the configurable non-volatile memory 230 that are allocated to the volatile main memory 210 or the solid state storage memory 220 may be configured to function with the volatile main memory 210 or the solid state storage memory 220 in the manner previously described.

Based on the determination at 410, the method 400 includes removing a portion of the memory resources of the third memory from functioning with the first or second memory when it is determined that the amount of the first or second memory being used by the one or more applications is more than is needed for the memory needs of the one or more applications (430). For example, as previously described when the monitor module determines that that load of one or more applications 240 on either the volatile main memory 210 or the solid state storage memory 220 has dropped below the low threshold 265, the monitor module may request that the OS memory manager 250 reallocate come of the memory resources of the configurable non-volatile memory 230 as needed. The memory resources of the configurable non-volatile memory 230 that are reallocated to the volatile main memory 210 or the solid state storage memory 220 may be configured to function with the volatile main memory 210 or the solid state storage memory 220 in the manner previously described.

Figure 5:
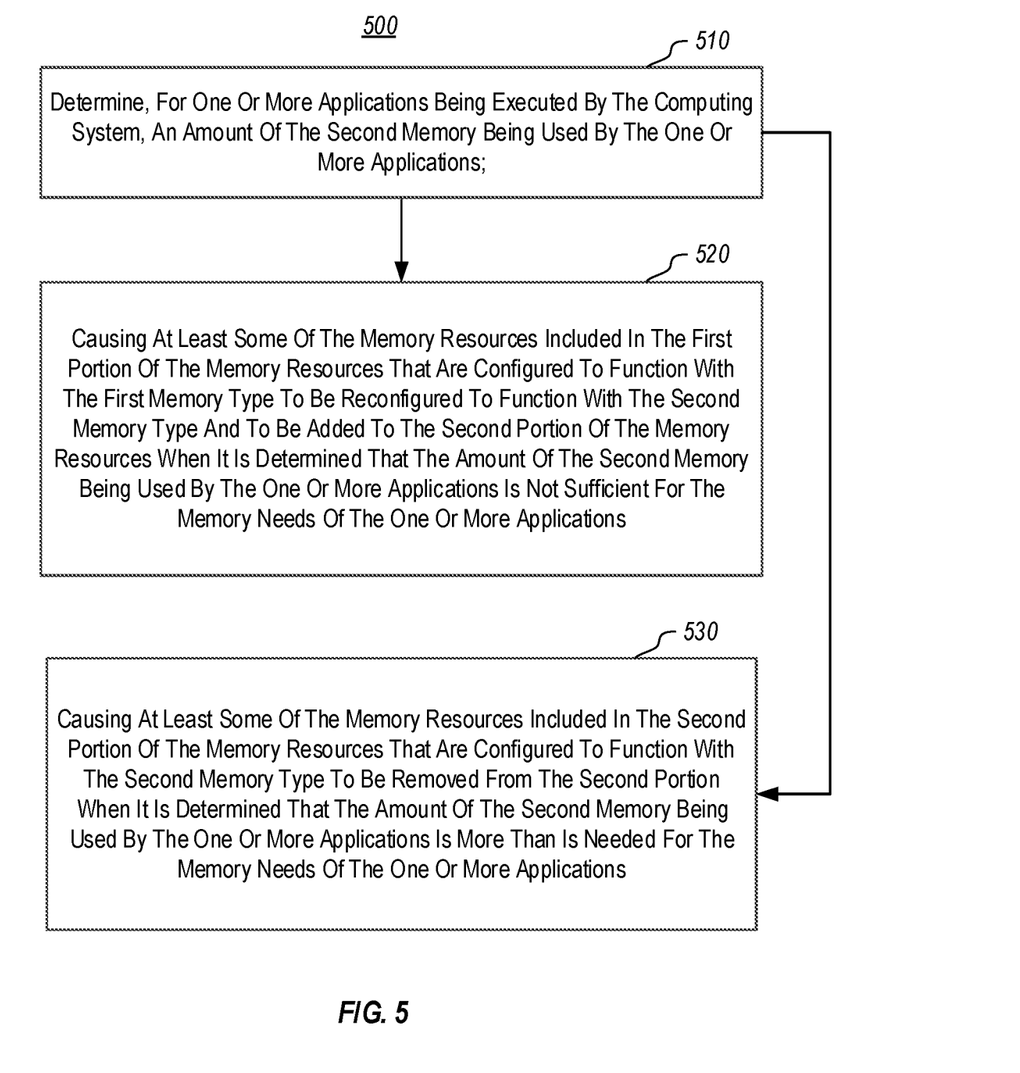
FIG. 5 illustrates a flow chart of an alternative example method for dynamically sharing non-volatile memory across other memory types.

FIG. 5 illustrates a flow chart of an alternative example method 500 for dynamically sharing non-volatile memory across other memory types. The method 400 will be described with respect to one or more of the FIGS. 2A-2C discussed previously.

The method 500 includes determining, for one or more applications being executed by the computing system, an amount of the first or second memory being used by the one or more applications. (510). For example, as previously described the monitor module 260 may determine how much of the volatile main memory 210 and/or the solid state storage memory 220 are being used by one or more of the applications 240.

Based on the determination at 510, the method 500 includes causing at least some of the memory resources included in the first portion of the memory resources that are configured to function with the first memory type to be reconfigured to function with the second memory type and to be added to the second portion of the memory resources when it is determined that the amount of the second memory being used by the one or more applications is not sufficient for the memory needs of the one or more applications (520). For example, as previously described when the monitor module 260 determines that that load of one or more applications 240 on the solid state storage memory 220 has exceeded the high threshold 266, the monitor module may request that the OS memory manager 250 allocate the NVM portion 235B of the volatile main memory 210 to the NVM portion 236 of the solid state storage memory 220. The NVM portion 235B may be reconfigured to function as part of the write cache in accordance with the solid state storage memory 220.

Based on the determination at 510, the method 500 includes causing at least some of the memory resources included in the second portion of the memory resources that are configured to function with the second memory type to be removed from the second portion when it is determined that the amount of the second memory being used by the one or more applications is more than is needed for the memory needs of the one or more applications (530). For example, as previously described when the monitor module 260 determines that that the load of one or more applications 240 on the solid state storage memory 220 has dropped below the low threshold 265, the monitor module may request that the OS memory manager 250 reallocate the NVM portion 235B to the volatile main memory 210 in the manner previously described. Although not described further here, steps 520 and 530 may also be performed with respect to the volatile main memory 210 as described in relation to FIG. 2C.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system configured to dynamically share memory across other memory types, the computing system comprising:
   a first memory that is of a first type of memory;
   a second memory that is of a second type of memory that is different from the first type, the first type of memory being faster than the second type of memory;
   a third memory that is of a third type of memory that is different from the first type of memory and the second type of memory, the third type of memory being faster than the second type of memory, but slower than the first type of memory;
   one or more processors;
   one or more computer-readable hardware storage devices having stored thereon computer-executable instructions that are structured to be executable by the one or more processors to thereby cause the computing system to:
      configure the first memory as part of main memory of an operating system that executes one or more applications;
      configure the second memory to be accessible by a file system of the operating system;
      dynamically configure a first portion of the third memory as part of the main memory and a second portion of the third memory as part of write cache memory for accelerating access to the second memory, the dynamic configuration of the third memory comprising:
         determining, for the one or more applications being executed by the operating system, an amount of the main memory or an amount of write cache memory being used by the one or more applications based on a value associated with at least one of the one or more applications, the value being a part of a sliding scale, such that a lower value is indicative of read heavy, and a higher value is indicative of write heavy; and
         based on the determination of the amount of the main memory or the amount of the write cache memory being used by the one or more applications:
            reconfiguring a first sub-portion of the first portion of the third memory from being part of main memory to being part of the write cache memory when it is determined that the amount of the write cache memory is not sufficient for executing the one or more applications; or
            reconfiguring a second sub-portion of the second portion of the third memory from being part of the write cache memory to being part of the main memory when it is determined that a total amount of the main memory is insufficient for executing the one or more applications.

2. The computing system according to claim 1, wherein the first memory is volatile main memory and the second memory is solid state storage memory.

3. The computing system according to claim 2, wherein the second portion of the third memory is configured to function with the second memory as the write cache memory.

4. The computing system according to claim 1, wherein the determination of the amount of the first or second memory being used by the one or more applications is based on a first and second threshold,
   wherein the first sub-portion of the third memory is removed from functioning with the first memory as main memory when the first threshold is reached, and
   wherein the second sub-portion of the third memory is reconfigured to function with the first memory as main memory when the second threshold is reached.

5. The computing system according to claim 4, wherein a buffer region is formed between the first and second thresholds, the buffer region being configured to account for small changes in the amount the first or second memory being used by the one or more applications without a need to configure or remove any sub-portion of the third memory.

6. The computing system in according to claim 4, wherein the one or more applications specify values of the first and second thresholds.

7. The computing system according to claim 1, wherein the one or more processors include one of a field programmable gate array (FPGA), an application specific integrated circuit (ASIC).

8. The computing system according to claim 1, wherein the computer executable instructions include hard coded logic gates.

9. A method for dynamically sharing non volatile memory of a computing system across other memory types, the computing system comprising:
   a first memory that is a first type of memory;
   a second memory that is of a second type that is different from the first type;

a third memory that is of a third type of memory that is different from the first type of memory and the second type of memory, the third type of memory being faster than the second type of memory, but slower than the first type of memory;

the method comprising:

configuring the first memory as part of main memory of an operating system that executes one or more applications;

configuring the second memory to be accessible by a file system of the operating system;

dynamically configuring a first portion of the third memory as part of the main memory and a second portion of the third memory as part of write cache memory for accelerating access to the second memory, the dynamic configuration of the third memory comprising determining, for the one or more applications being executed by the operating system, an amount of the main memory or an amount of write cache memory being used by the one or more applications based on a value associated with at least one of the one or more applications, the value being a part of a sliding scale, such that a lower value is indicative of read heavy, and a higher value is indicative of write heavy;

based on the determination of the amount of the main memory or the cache memory being used by the one or more applications:

causing a first sub-portion of the first portion of the third memory that is configured to function as the main memory to be reconfigured to function as the write cache memory and to be added to the write cache memory when it is determined that the amount of the write cache memory being used by the one or more applications is not sufficient for the one or more applications; or causing a second sub-portion of the second portion of the third memory that is configured to function as the write cache memory to be removed from the persistent write cache memory when it is determined that the amount of the main memory is insufficient for executing the one or more applications.

10. The method according to claim 9, wherein the first memory is volatile main memory and the second memory is solid state storage memory.

11. The method according to claim 10, wherein the second portion of the third memory is configured to function with the second memory as the write cache memory.

12. The method according to claim 9, wherein the determination of the amount of the first or second memory being used by the one or more applications is based on a first and second threshold, wherein the first sub-portion of the third memory is removed from functioning with the first memory as main memory when the first threshold is reached, and wherein the second sub-portion of the third memory is reconfigured to function with the first memory as main memory when the second threshold is reached.

13. The method according to claim 12, wherein a buffer region is formed between the first and second thresholds, the buffer region being configured to account for small changes in the amount the first or second memory being used by the one or more applications without a need to configure or remove any sub-portion of the third memory.

14. The method according to claim 13, wherein the one or more applications specify values of the first and second thresholds by specifying if the one or more applications are read heavy or write heavy.

15. The method according to claim 9, wherein the first sub-portion included in the first portion of the third memory that is configured to function with the first memory type is reconfigured to function with the second memory type when the one or more applications are write heavy.

16. The method according to claim 9, wherein the second sub-portion of the third memory included in the second portion of the third memory that is configured to function with the second memory type is caused to be removed from the second portion when the one or more applications is read heavy.

17. A computer program product comprising one or more hardware storage devices having stored thereon computer-executable instructions that are structured such that, when the computer-executable instructions are executed by one or more processors of a computing system, the computer-executable instructions cause the computing system to dynamically share memory across other memory types, wherein:

the computing system includes:

a first memory that is of a first type of memory, a second memory that is of a second type that is different from the first type, and a third memory that is of a third type of memory that is different from the first type of memory and the second type of memory, the third type of memory being faster than the second type of memory, but slower than the first type of memory;

the computer-executable instructions cause the computing system to:

configure the first memory as part of main memory of an operating system that executes one or more applications;

configure the second memory to be accessible by a file system of the operating system;

dynamically configure a first portion of the third memory as part of the main memory and a second portion of the third memory as part of write cache memory for accelerating access to the second memory, the dynamic configuration of the third memory comprising:

determining, for the one or more applications being executed by the operating system, an amount of the main memory or an amount of write cache memory being used by the one or more applications; and based on the determination of the amount of the main memory or write cache memory being used by the one or more applications based on a value associated with at least one of the one or more applications, the value being a part of a sliding scale, such that a lower value is indicative of read heavy, and a higher value is indicative of write heavy:

causing at least some of the first portion of the third memory that is configured to function as the main memory to be reconfigured to function as the write cache memory and to be added to the write cache memory when it is determined that the amount of the write cache memory being used by the one or more applications is not sufficient for memory needs of the one or more applications; or causing at least some of the second portion of the third memory that are configured to function as the write cache memory to be removed from the write cache when it is determined that the amount of the main memory being used by the one or more applications is in sufficient for executing the one or more applications.

18. The computer program product according to claim 17, wherein the first memory is volatile main memory and the second memory is solid state storage memory.

* * * * *